US012764401B1

(12) United States Patent
Bagalkar et al.

(10) Patent No.: US 12,764,401 B1
(45) Date of Patent: Oct. 13, 2026

(54) TEMPERATURE CONTROLLED CAMERA LENS MECHANISM FOR ENHANCED PERCEPTION OF SENSOR SUITES

(71) Applicant: Torc Robotics, Inc., Blacksburg, VA (US)

(72) Inventors: Saurabh Satish Bagalkar, Austin, TX (US); Akshay Pai Raikar, Austin, TX (US); William Gray Davis, Austin, TX (US)

(73) Assignee: Torc Robotics, Inc., Blacksburg, VA (US)

( * ) Notice: Subject to any disclaimer, the term of this patent is extended or adjusted under 35 U.S.C. 154(b) by 0 days.

(21) Appl. No.: 19/233,063

(22) Filed: Jun. 10, 2025

(51) Int. Cl.
*H04N 23/52* (2023.01)
*G02B 27/00* (2006.01)

(52) U.S. Cl.
CPC ......... *H04N 23/52* (2023.01); *G02B 27/0006* (2013.01)

(58) Field of Classification Search
CPC ............................ H04N 23/52; G02B 27/0006
See application file for complete search history.

(56) References Cited

U.S. PATENT DOCUMENTS

| | | | | |
|---|---|---|---|---|
| 10,013,616 B2 | 7/2018 | Gehrke | | |
| 10,761,319 B2 | 9/2020 | Kumar | | |
| 10,894,275 B2 | 1/2021 | Byrne et al. | | |
| 11,042,026 B2 | 6/2021 | Fedigan et al. | | |
| 11,420,238 B2 | 8/2022 | Magee et al. | | |
| 11,440,509 B2 | 9/2022 | Deegan | | |
| 11,535,158 B2 | 12/2022 | Liu et al. | | |
| 11,750,905 B2 | 9/2023 | Lu | | |
| 11,801,795 B2 | 10/2023 | Sauer et al. | | |
| 12,115,912 B2 | 10/2024 | Liu et al. | | |
| 12,231,752 B2 | 2/2025 | Rekstad, Jr. et al. | | |
| 2011/0080479 A1* | 4/2011 | Trumbo | ................. | H04N 23/71 348/E5.045 |
| 2016/0272163 A1 | 9/2016 | Dreiocker et al. | | |
| 2017/0172401 A1* | 6/2017 | Ide | ......................... | A61B 1/127 |
| 2017/0357035 A1* | 12/2017 | Nunnink | ................ | G02B 7/028 |
| 2018/0141521 A1 | 5/2018 | Irie et al. | | |
| 2020/0393671 A1 | 12/2020 | Kumar | | |
| 2022/0163751 A1 | 5/2022 | Park et al. | | |
| 2023/0095150 A1* | 3/2023 | Phinisee | ............... | F24H 9/2071 374/179 |

* cited by examiner

*Primary Examiner* — Michael E Teitelbaum
(74) *Attorney, Agent, or Firm* — McCarter & English, LLP

(57) ABSTRACT

An autonomy computing system is configured to receive a first temperature measurement at a first time $t_1$ and a second temperature measurement at a second time $t_2$ measured proximate a lens surface for a camera sensor using a first temperature sensor; receive a third temperature measurement at the first time $t_1$ and a fourth temperature measurement at the second time $t_2$ measured using a second temperature sensor for ambient air of a vehicle; compute a first change of temperature between the second temperature measurement and the first temperature measurement, and a second change of temperature between the fourth temperature measurement and the third temperature measurement; and in response to determining that the first change of temperature is greater than the second change of temperature by a predetermined threshold value, activate a heating element in proximity of the camera sensor to reduce presence of a liquid particle at the lens surface.

20 Claims, 5 Drawing Sheets

TEMPERATURE CONTROLLED CAMERA LENS MECHANISM FOR ENHANCED PERCEPTION OF SENSOR SUITES

TECHNICAL FIELD

The field of the disclosure relates to autonomous vehicles and, more specifically, detecting and removing condensation accumulated on a lens surface of a camera sensor of an autonomous vehicle.

BACKGROUND OF THE INVENTION

Autonomous vehicles employ fundamental technologies such as perception, localization, behaviors and planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Localization technologies may rely on inertial navigation system (INS) data. Behaviors and planning technologies determine how to move through the sensed environment to reach a planned destination. Behaviors and planning technologies process data representing the sensed environment and localization or mapping data to plan maneuvers and routes to reach the planned destination for execution by a controller or a control module. Controller technologies use control theory to determine how to translate desired behaviors and trajectories into actions undertaken by the vehicle through its dynamic mechanical components. This includes steering, braking and acceleration.

Autonomous vehicles can have numerous camera sensors mounted at various different locations depending on a type and a size of the autonomous vehicle. Camera sensors are one example of sensor modalities that enable perception in autonomous vehicles. However, in rainy or wet conditions, data collected by camera sensors can be degraded or inaccurate as a result of condensation or water droplets on the lens.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, an autonomy computing system including at least one memory configured to store machine executable instructions, and at least one processor coupled to the at least one memory and configured to execute the machine executable instructions is disclosed. The machine executable instructions configure the at least one processor to: (i) receive a first temperature measurement at a first time $t_1$ and a second temperature measurement at a second time $t_2$, wherein the first temperature measurement and the second temperature measurement are measured proximate a lens surface for a camera sensor using a first temperature sensor, wherein the second time $t_2$ is later than the first time $t_1$; (ii) receive a third temperature measurement at the first time $t_1$ and a fourth temperature measurement at the second time $t_2$, wherein the third temperature measurement and the fourth temperature measurement are measured using a second temperature sensor for ambient air of a vehicle on which the camera sensor, the first temperature sensor, and the second temperature sensor are mounted; (iii) compute a first change of temperature between the second temperature measurement and the first temperature measurement; (iv) compute a second change of temperature between the fourth temperature measurement and the third temperature measurement; and (v) in response to determining that the first change of temperature is greater than the second change of temperature by a predetermined threshold value, activate a heating element in proximity of the camera sensor to increase temperature and thereby reducing presence of a liquid particle at the lens surface.

In another aspect, a computer-implemented method for detecting presence of a liquid particle at a camera lens surface is disclosed. The computer-implemented method includes receiving a first temperature measurement at a first time $t_1$ and a second temperature measurement at a second time $t_2$. The first temperature measurement and the second temperature measurement are measured proximate the camera lens surface for a camera sensor using a first temperature sensor, wherein the second time $t_2$ is later than the first time $t_1$. The computer-implemented method includes receiving a third temperature measurement at the first time $t_1$ and a fourth temperature measurement at the second time $t_2$. The third temperature measurement and the fourth temperature measurement are measured using a second temperature sensor for ambient air of a vehicle on which the camera sensor, the first temperature sensor, and the second temperature sensor are mounted. The computer-implemented method includes computing a first change of temperature between the second temperature measurement and the first temperature measurement, and a second change of temperature between the fourth temperature measurement and the third temperature measurement. The computer-implemented method includes activating a heating element in proximity to the camera sensor to increase temperature and thereby reducing presence of a liquid particle at the lens surface in response to determining that the first change of temperature is greater than the second change of temperature by a predetermined threshold value.

In yet another aspect, an autonomous vehicle including a plurality of camera sensors, at least one memory configured to store machine executable instructions, and at least one processor communicatively coupled with the at least one memory is disclosed. The at least one processor is configured to execute the machine executable instructions for detecting presence of a liquid particle at a camera lens surface of a camera sensor of the plurality of camera sensors by performing operations including (i) receiving a first temperature measurement at a first time $t_1$ and a second temperature measurement at a second time $t_2$, wherein the first temperature measurement and the second temperature measurement are measured proximate the camera lens surface of the camera sensor using a first temperature sensor, wherein the second time $t_2$ is later than the first time $t_1$; (ii) receiving a third temperature measurement at the first time $t_1$ and a fourth temperature measurement at the second time $t_2$, wherein the third temperature measurement and the fourth temperature measurement are measured using a second temperature sensor for ambient air of a vehicle on which the camera sensor, the first temperature sensor, and the second temperature sensor are mounted; (iii) computing a first change of temperature between the second temperature measurement and the first temperature measurement; (iv) computing a second change of temperature between the fourth temperature measurement and the third temperature measurement; and (v) in response to determining that the first change of temperature is greater than the second change of temperature by a predetermined threshold value, activating a heating element in proximity of the camera sensor to increase temperature and thereby reducing presence of a liquid particle at the lens surface.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
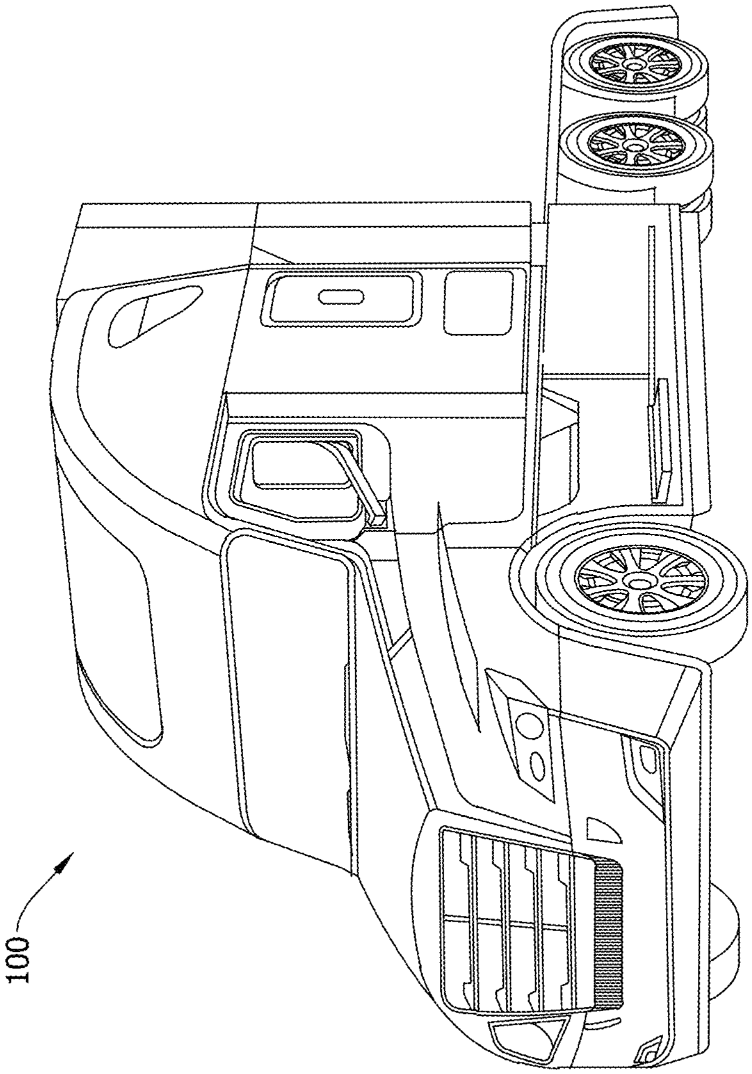
FIG. 1. is a schematic view of an autonomous truck.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

Some structural or method features may be shown in specific arrangements and/or orderings in the drawings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments, and, in some embodiments, it may not be included or may be combined with other features.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

One or more of the following terms may be used in the disclosure, and their definition is provided below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

Mission control: Mission control, as described in the present disclosure, refers to one or more application servers, and one or more database servers communicatively coupled with each other and one or more autonomous vehicles of a fleet. Mission control receives sensor data collected by one or more sensors of the one or more autonomous vehicles of the fleet and transmits data including, but not limited to, trajectory data, described herein, to the one or more autonomous vehicles of the fleet.

Inaccurate camera sensor data capture can occur due to condensation on a camera lens of a camera sensor. The present disclosure addresses the issue of condensation on the camera lens by using an integrated micro-controller enabled heating element placed near the camera sensor lens. The heating element is configured to alter the surface temperature of the camera lens with a built-in module placed near a camera sensor to de-humidify the camera sensor lens.

The disclosed systems and methods also identify droplets, e.g., water droplets, or condensation, on a lens surface of a camera sensor. Generally, for scene understanding in autonomous vehicles, recognition and perception stacks depend on reliable image capture using one or more camera sensors. The presence of water droplets or condensation on a lens can obscure Field-of-Vision (FoV), create color distortion, cause blurring and inconsistent focus, among other issues, that can impact the accuracy of the captured images. These issues can impair object detection, classification, and localization stacks. While water droplets or condensation on a lens of a camera sensor generally occurs in rainy conditions or wet environment, including morning dew, splashes, snow, coastal areas, etc.

In some embodiments of the disclosed systems and methods, temperature differences are measured on a camera lens to detect the cooling effect of water droplet evaporation or condensation. Temperature differences can be measured using temperature sensors capable of detecting accurate and precise differences in surface temperature. In some embodiments, temperature sensors can be integrated around the camera lens and operate as a separate module from the camera sensor itself. The temperature sensors, or a temperature sensor module, are responsible for monitoring temperature across the camera lens surface periodically. In certain embodiments, monitoring may be conducted at a high frequency, which may also be referred to as "continuous" monitoring. The frequency at which monitoring is conducted generally should coordinate with the rate at which the autonomy computing system or autonomous vehicle can respond and with the rate at which conditions on the lens surface can change. When water droplets form on the camera lens, water droplets begin to evaporate and result in localized cooling on the camera lens. The localized cooling is detectable as small temperature differentials across the lens surface. Additionally, in certain embodiments, the disclosed systems and methods can determine whether the camera lens has water droplet accumulation or other types of liquid accumulation based upon a rate in temperature change. The rate in temperature change is generally in proportion to an evaporation rate of the liquid.

The disclosed systems and methods enable detection of water or other liquid accumulation or condensation on a camera sensor lens surface using temperature sensors and do not require any image processing. Advantageously, the disclosed systems and methods do not rely on the visual output of camera sensors themselves, which, as explained above, could be impaired by the conditions being detected or monitored for. While various aspects in the present disclosure are described with reference to temperature sensors for monitoring presence of liquid particles or condensation on the camera lens surface, humidity sensors may also be used in addition to, or in alternate of, temperature sensors for detecting presence of liquid particles causing change in humidity due to their presence proximate to the camera lens surface.

The disclosed systems and methods further include upon detection of presence of liquid particles or condensation on the camera lens surface by the autonomy computing system based upon sensor data reported by the temperature sensors, a heating element is activated to remove condensation, and upon further update from the temperature sensors that the condensation has been removed, the heating element is deactivated.

FIG. 1 illustrates a vehicle 100, such as a truck that may be conventionally connected to a single or tandem trailer to transport the trailer (not shown in FIG. 1) to a desired location. The vehicle 100 includes a cabin that can be supported by, and steered in the required direction, by front wheels and rear wheels that are partially shown in FIG. 1. Front wheels are positioned by a steering system that includes a steering wheel and a steering column (not shown in FIG. 1). The steering wheel and the steering column may be located in the interior of cabin.

The vehicle 100 may be an autonomous vehicle, in which case the vehicle 100 may omit the steering wheel and the steering column to steer the vehicle 100. Rather, the vehicle 100 may be operated by an autonomy computing system (not shown in FIG. 1) of the vehicle 100 based on data collected by a sensor network (not shown in FIG. 1) including one or more sensors. The vehicle 100 may be an ego vehicle referenced herein.

Figure 2:
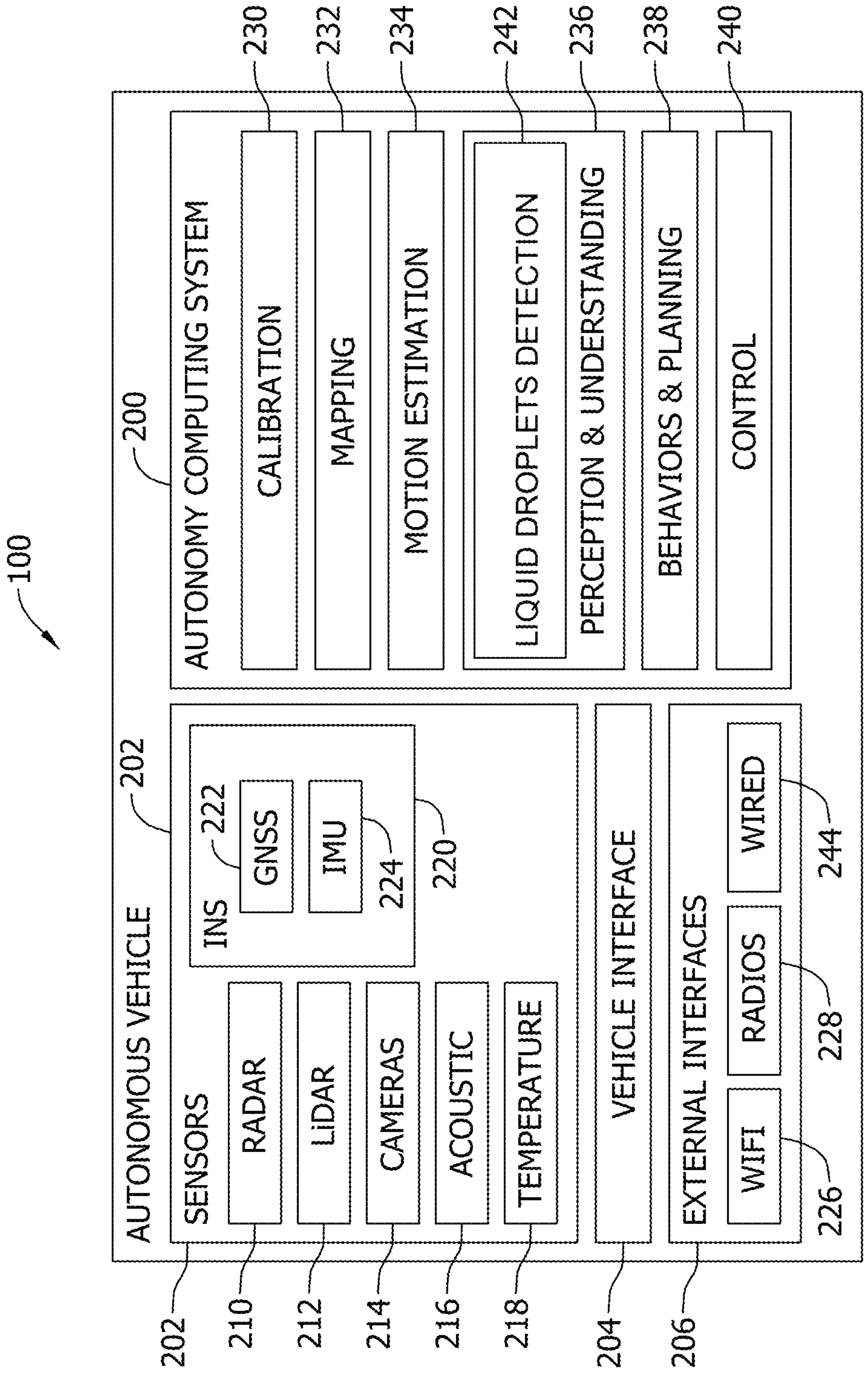
FIG. 2 is a block diagram of the autonomous truck shown in FIG. 1.

FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, humidity sensors, and navigation sensors. Navigation sensors, as described herein, may be one or more inertial navigation system (INS) sensors (or systems) 220, one or more global navigation satellite system (GNSS) sensors 222, or one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operations of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed to identify one or more construction markers or other objects in the environment surrounding autonomous vehicle 100. In some embodiments, the image data generated by cameras 214 may be sent to autonomy computing system 200 or other aspects of autonomous vehicle 100 or mission control (a hub) or both.

Cameras 214 may have temperature sensors 218 (e.g., one or more of negative temperature coefficient (NTC) thermistors, resistance temperature detectors (RTDs), thermocouples, or semiconductor-based integrated (IC) sensors) positioned on an external surface, or an internal surface, or both, to measure temperature on a camera lens surface of each of cameras 214. Additionally, temperature sensors 218 may be positioned on other areas of the autonomous vehicle 100, e.g., to measure ambient temperature. Additionally, or alternatively, cameras 214 may have humidity sensors.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination to identify one or more construction markers (or nodes) around autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment. Additionally, or alternatively, GNSS receiver 222 may be configured to receive RTK and GNSS position information from satellite-based systems.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5G, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connections while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and a liquid droplets detection module 242. The liquid droplets detection module 242, for example, may be embodied within another module, such as perception and understanding module 236, behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100. The liquid droplets detection module 242 is configured to efficiently and robustly identify presence of liquid droplets on the surface of a camera lens as described in detail in the present disclosure.

Figure 3:
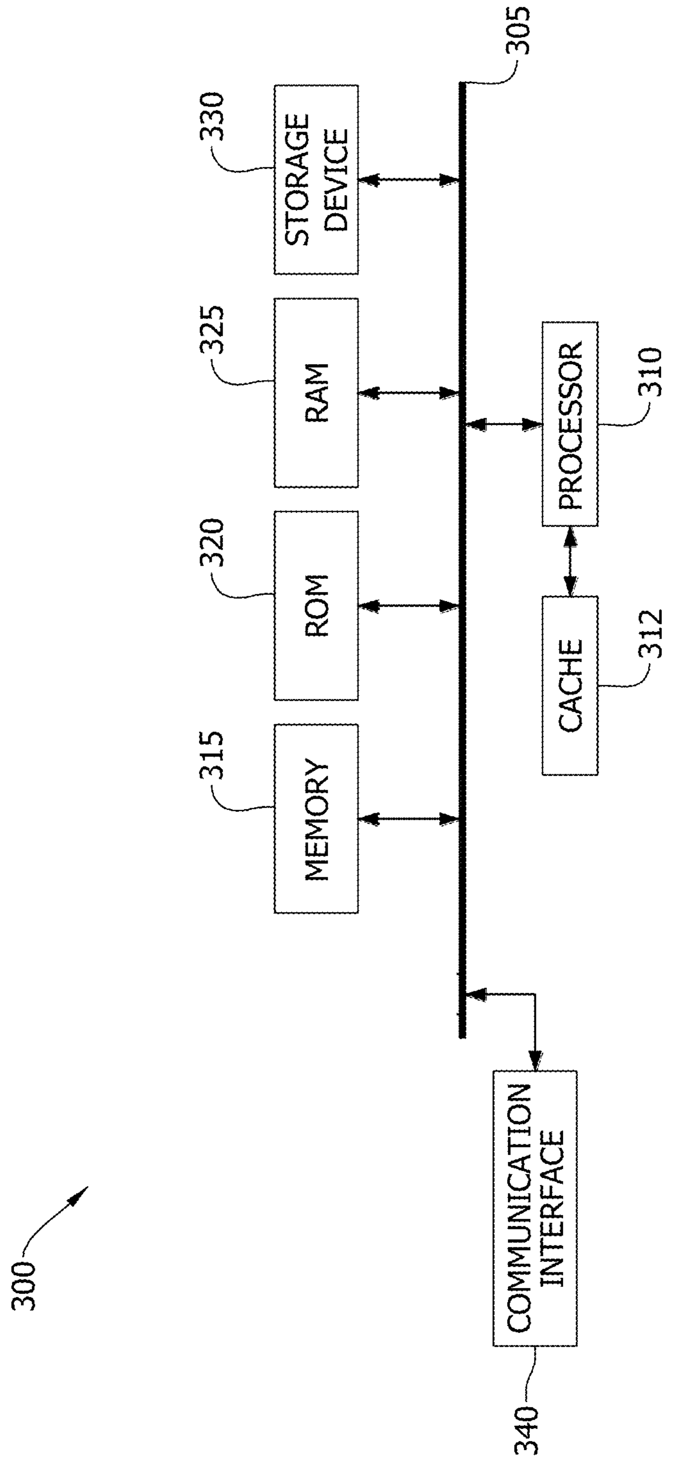
FIG. 3 is a block diagram of an example computing system.

FIG. 3 illustrates an example computing system 300 that can implement various techniques, processes, functions, or methods described herein. Computing system 300 may be embodied within, for example, autonomous vehicle 100 shown in FIG. 1, such as autonomy computing system 200 shown in FIG. 2. The components of computing system 300 are shown in electrical communication with each other using a connection 305, such as a bus. The example computing system 300 includes a processing unit (CPU or processor) 310 and a computing device connection 305 that couples various computing device components, including computing device memory 315, such as a read only memory (ROM) 320 and a random-access memory (RAM) 325, to processor 310.

The processor 310 may be communicatively coupled with a communication interface 340 to communicate with external entities such as, mission control, or one or more other vehicles using V2V communication. Accordingly, the communication interface 340 may include one or more of a radio interface, an electronic sign board mounted on autonomous vehicle 100, a public address system or a loudspeaker positioned at autonomous vehicle 100. The radio interface may be configured for at least one of: (i) a vehicle-to-vehicle communication technique, (ii) citizens band radio frequencies; (iii) a Bluetooth signal; and (iv) a short message service (SMS) technology.

Computing system 300 can include a cache 312 of high-speed memory connected directly with, in close proximity to, or integrated as part of processor 310. Computing system 300 can copy data from memory 315 and/or storage device 330 to cache 312 for quick access by processor 310. In this way, cache 312 can provide a performance boost that avoids processor 310 delays while waiting for data. These and other modules can control or be configured to control processor 310 to perform various actions. Other computing device memory 315 may be available for use as well. Memory 315 can include multiple different types of memory with different performance characteristics. Processor 310 can include any general-purpose processor, central processing unit (CPU), or graphics processing unit (GPU) in combination with a hardware or software provision configured to control processor 310 and stored in storage device 330, as well as any special-purpose processor where software instructions are incorporated into the processor design. Processor 310 may be a self-contained system, containing multiple cores or processors, a bus, memory controller, cache, etc. A multi-core processor may be symmetric or asymmetric.

Storage device 330 is a non-volatile memory and can be one or more of a hard disk or other types of computer readable media that can store data that are accessible by a computer, such as a magnetic cassette, flash memory card, solid state memory device, digital versatile disk, cartridge, RAM 325, ROM 320, or hybrids thereof. Memory 315 or storage device 330 can include software, code, firmware, etc., for controlling processor 310. Other hardware or software modules are contemplated. Memory 315 and storage device 330 are connected to computing device connection 305. In one aspect, a hardware module that performs a particular function can include the software component stored in a computer-readable medium in connection with the necessary hardware components, such as processor 310, computing device connection 305, and so forth, to carry out the function. In the example embodiment, processor 310 may be programmed by encoding an operation or function using one or more executable instructions and providing the executable instructions in memory 315 or storage device 330.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Figure 4:
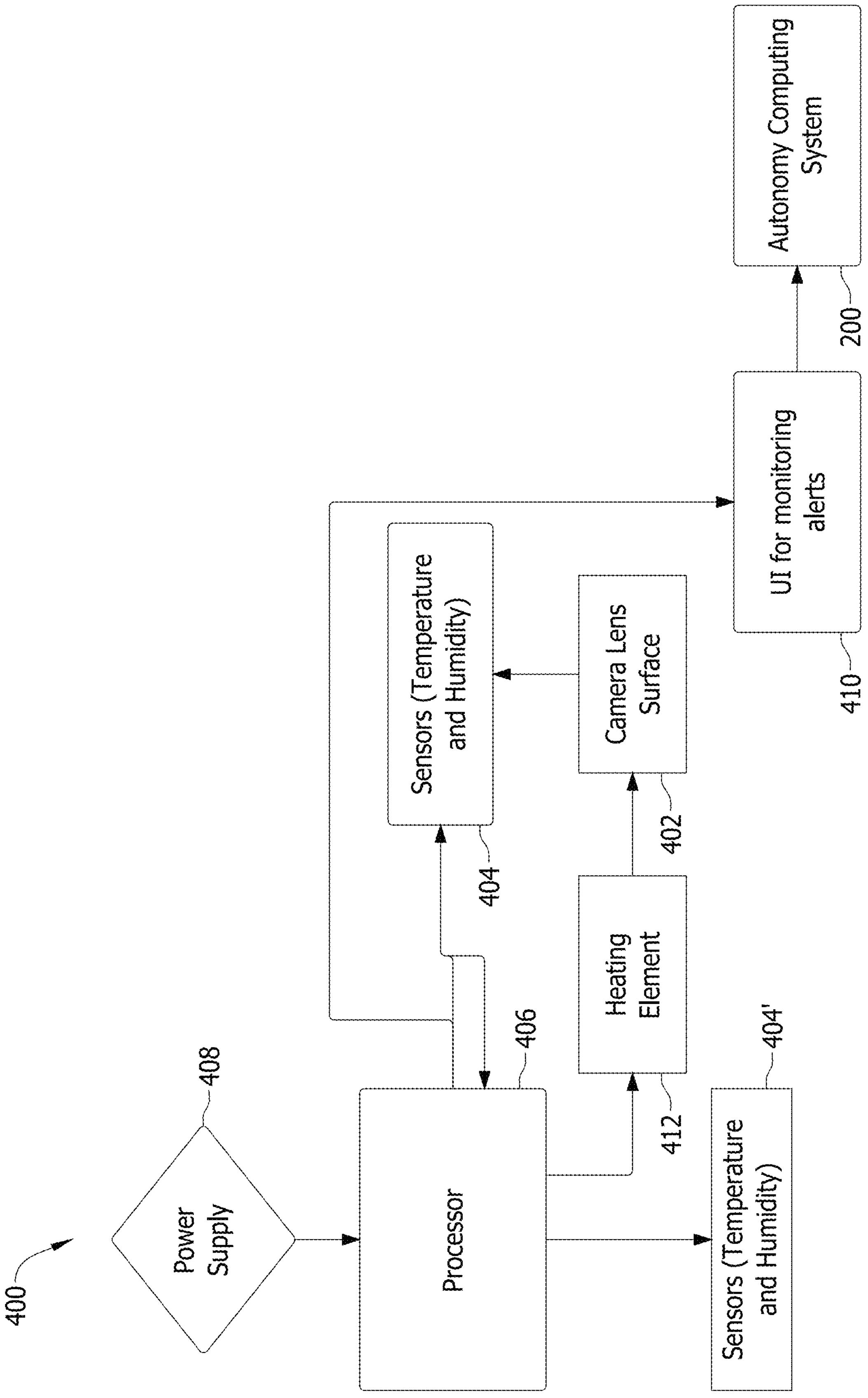
FIG. 4 is a block diagram of a camera sensor with sensors on a camera lens surface for detecting liquid particles on the camera lens surface.

FIG. 4 is a block diagram 400 showing a part of the autonomy computing system shown in FIG. 2. As shown in the block diagram 400, a camera sensor (not shown) with a plurality of sensors 404 positioned on or proximate a camera lens surface 402 for detecting water or other liquid particles on the camera lens surface 402. The plurality of sensors 404 and processing of sensor data based on the plurality of sensors 404 are different and independent of the camera sensor function. Camera sensor may, for example, be embodied on an autonomous vehicle, such as autonomous vehicle 100 shown in FIGS. 1 and 2. Sensors 404 can be positioned on or proximate an interior surface of the camera lens or an external surface of the camera lens. The sensors 404 are communicatively coupled with a processor 406. Processor 406 can be any general-purpose processor, central processing unit (CPU), or graphics processing unit (GPU), a digital signal processor (DSP), a field programmable gate array (FPGA), or an application specific integrated circuit (ASIC) coupled with an electric power supply 408.

As described herein, sensors 404 may be one or more temperature sensors. Additionally, or alternatively, sensors 404 may also include one or more humidity sensors. As described herein, presence of condensation or liquid particles, e.g., water particles, causes an increase in humidity, and accordingly a change in humidity, e.g., an increase in humidity, by humidity sensors in areas proximate to the camera lens sensor in comparison to other areas of the autonomous vehicle over the same period may suggest presence of the liquid particles at or proximate to the camera lens surface.

As described herein, the processor 406 may periodically receive sensor data from the plurality of sensors 404. Based upon the received sensor data, the processor 406 determines a change in temperature over time. The change in temperature over time at the camera lens surface 402 is compared with a change in temperature over the same time for other areas of the autonomous vehicle, e.g., autonomous vehicle 100, using a plurality of sensors 404'. The sensors 404' are communicatively coupled with the processor 406 and include one or more temperature sensors. Additionally, or alternatively, the sensors 404' include one or more humidity sensors. The sensors 404' also periodically send sensor data to the processor 406.

Further, as described herein with respect to FIG. 5, when a particular camera sensor's status, such as the status of camera sensor, is changed to an inactive or offline status upon determining presence of a liquid particle (including a water particle) or condensation for a predetermined threshold period or a predetermined time duration, as descried below, the processor 406 may cause an alert to be displayed on a user interface 410 on a display device.

Further, along with changing the particular camera sensor's status to an inactive status or offline status, an autonomy computing system 200 (shown in FIG. 2, also referenced herein as a virtual driver stack) also sends a command or instructions to the processor 406 to activate a heating element 412 (or a heating filament 412) to raise temperature in an area near the camera lens surface 402. Alternatively, the processor 406 may generate a command or instructions to active a heating element 412. The sensors 404 may periodically send sensor data to the processor 406 upon activation of the heating element 412 to reduce condensation or presence of a liquid particle (including a water particle) near the camera lens or on the camera lens surface 402. As the condensation or presence of a liquid particle (including a water particle) decreases, a difference between a change in temperature over time at the camera lens surface 402 and a change in temperature over the same time for other areas of the autonomous vehicle, e.g., autonomous vehicle 100, measured using a plurality of sensors 404' comes within a predetermined or preconfigured threshold value range, the heating element 412 may be deactivated. The heating element 412 may be deactivated based upon a command or instructions generated by the autonomy computing system 200 or the processor 406. Additionally, or alternatively, the autonomy computing system may also generates minimal risk maneuver commands/controls upon upon determining presence of a liquid particle (including a water particle) or condensation for a predetermined threshold period or a predetermined time duration.

Figure 5:
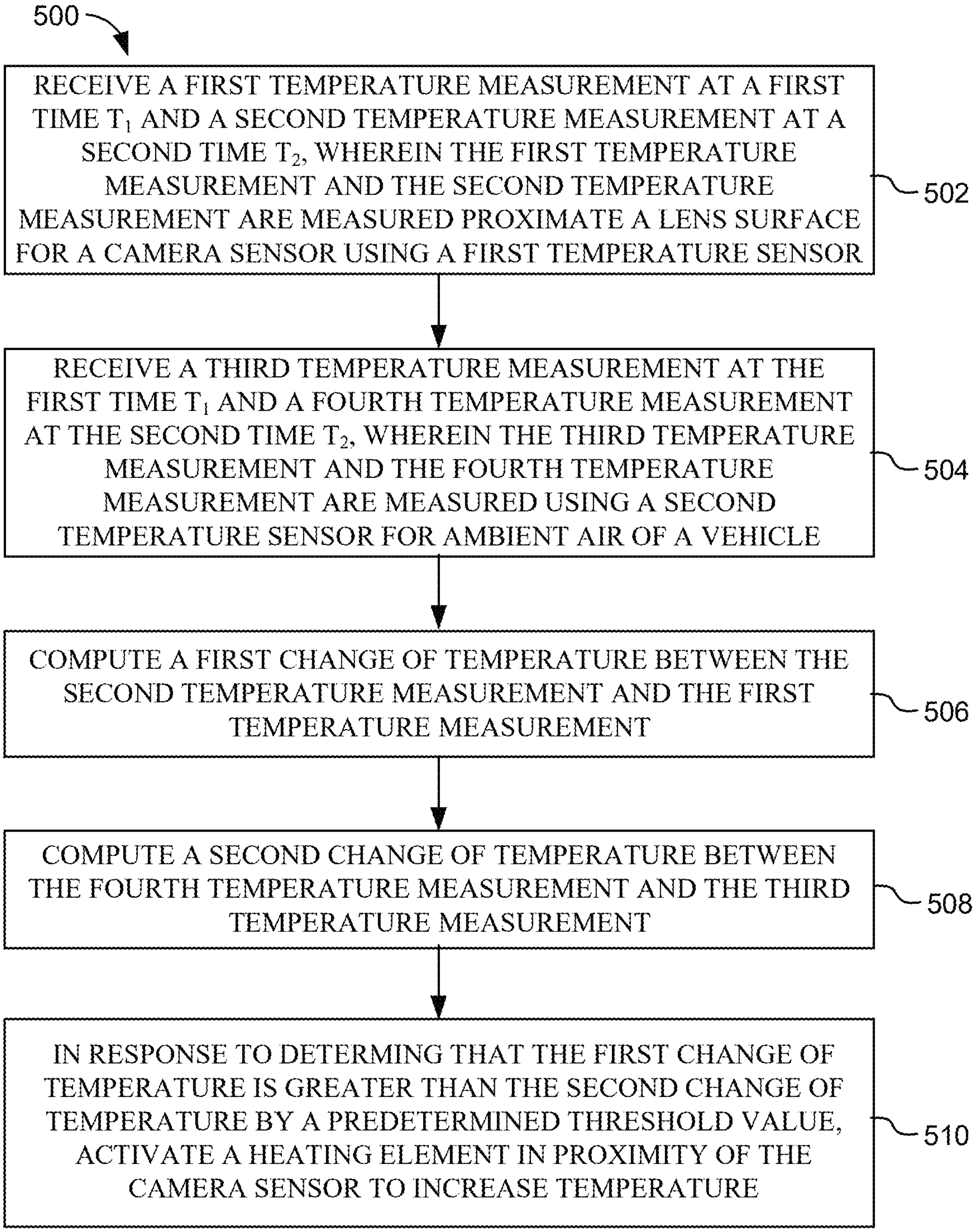
FIG. 5 is a flow-chart of an example method of activating removal of condensation upon detecting presence of a liquid particle or condensation at a camera lens surface.

FIG. 5 is a flow-chart of an example method 500 of activating removal of condensation upon detecting presence of a liquid particle or condensation at a camera lens surface. As shown in the flow-chart 500, temperature is measured or recorded with reference to each camera sensor. In particular, temperature is measured or recorded by a temperature sensor (e.g., a first temperature sensor) that is positioned or configured to measure temperature proximate a lens surface (or a camera lens surface) for a camera sensor. The first temperature sensor may measure temperature at an external surface of a camera sensor. Alternatively, the first temperature sensor may measure temperature at an internal surface of the camera sensor. Temperatures, for example, a first temperature measurement at a first time $t_1$ and a second temperature measurement at a second time $t_2$, are received 502. As described herein, the first temperature sensor may measure temperature periodically. The time $t_2$ is later than time $t_1$ in the present example.

Further, ambient air temperature is measured or recorded using a temperature sensor (e.g., a second temperature sensor) that is positioned or configured to measure ambient air temperature. The ambient air temperature measured by the second temperature sensor at the first time $t_1$ and a second time $t_2$ are a third temperature measurement and a fourth temperature measurement, respectively, and received 504. The first temperature sensor or the second temperature sensor used for temperature measuring 502 or 504 may include one or more of NTC thermistors, RTDs, thermocouples, or IC sensors.

As liquid particles, such as water, accumulate on a camera lens surface, temperature at the camera lens surface decreases. Further, liquid particle accumulation can cause the temperature on the lens surface to change at a different rate, e.g., decreases more quickly, than a general rate of temperature change of ambient air. The rate of change in temperature (e.g., a first change of temperature between temperatures measured at time $t_1$ and $t_2$) is computed 506 for the camera lens surface and the rate of change in temperature (e.g., a second change of temperature between temperatures measured at time $t_1$ and $t_2$) is computed 508 for ambient air, e.g., at one or more other areas of the autonomous vehicle, and compared.

For example, for an autonomous vehicle, based upon temperature measured at time $t_1$ and time $t_2$ at the camera lens surface, and temperature measured at the time $t_1$ and time $t_2$ for ambient air, e.g., at other parts of the autonomous vehicle, the first change of temperature between the temperature measured at time $t_2$ and time $t_1$ at the camera lens surface, and the second change of temperature between the ambient temperature measured at time $t_2$ and time $t_1$ for ambient air, e.g., at other parts of the autonomous vehicle, can be computed for comparing. As described herein, other parts of the autonomous vehicles are understood to be external parts of the autonomous vehicle that are exposed to ambient air.

Based upon the performed comparison, when it is determined that the rate of change in temperature (or the first change of temperature) for the camera lens surface is greater than the rate of change in temperature (or the second change of temperature) for the one or more other areas of the autonomous vehicle, for example, by a predetermined threshold value, then it may be determined that liquid particles are present on the camera lens surface. Accordingly, status of the particular camera sensor may be initiated to be offline or inactive for perception data processing, for a predetermined time duration such as, 2 minutes, or 5 minutes, etc. While the particular camera sensor is in the offline or inactive status, sensor data received from the particular camera sensor may be discarded or ignored for perception data processing until the particular camera sensor's status is changed to an active or online status again.

Additionally, while the particular camera sensor is in the offline or inactive status, an autonomy computing system 200 (shown in FIG. 2, also referenced herein as a virtual driver stack) sends a command or instructions to the processor 406 (shown in FIG. 4) to activate 510 a heating element 412 (or a heating filament 412, shown in FIG. 4) to raise temperature in an area near the camera lens surface 402 (shown in FIG. 4). Upon activation of the heating element 412 (or the heating filament 412), the sensors 404 may periodically send sensor data to the processor 406. The heating element 412 (or the heating filament 412) may be activated to increase temperature in the area near the camera lens surface 402 at anywhere from 5 to 15 degree Celsius.

As the condensation or presence of a liquid particle (including a water particle) decreases, a difference between a change in temperature over time at the camera lens surface 402 and a change in temperature over the same time for other areas of the autonomous vehicle, e.g., autonomous vehicle 100, measured using a plurality of sensors 404' comes within a predetermined or preconfigured threshold value range, the heating element 412 or the heating filament 412 may be deactivated.

Further, when it is determined that the rate of change in temperature for the camera lens surface is not greater than the rate of change in temperature for the one or more other areas of the autonomous vehicle, for example, by the predetermined threshold value, then it may be determined that condensation or liquid particles are not present on the camera lens surface, and the heating element 412 (or the heating filament 412) may be deactivated. Accordingly, the particular camera sensors may be considered to be online or active for perception data processing.

Further, temperature with respect to the camera lens surface and temperature with respect to the one or more other areas of the autonomous vehicle are frequently and periodically measured for detecting presence of liquid particles, such as water, degrading quality of the images captured by the camera sensor, and upon determining that the rate of change in temperature for the camera lens surface is not greater than the rate of change in temperature for the one or more other areas of the autonomous vehicle, the camera sensor that is previously in the offline or inactive status due to detection of presence of liquid particles may be again transitioned to an online or active status.

An example technical effect of the method and system described herein includes an ability to detect whether imaging data captured by a camera sensor is adversely affected for perception data processing due to water or other liquid particles accumulation on the camera lens surface and discard the imaging data collected by a camera sensor having water or other liquid particles accumulation on the camera lens surface. Alternatively, the camera sensor having water or other liquid particles accumulation on the camera lens surface may be made offline or inactive until there is no further water or other liquid particles accumulation on the camera lens surface.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a program, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random-access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, including the implementation or utilization of components of the systems or steps independently and separately from other described components or steps. Therefore, it is manifestly intended that embodiments described herein be limited only by the claims.

What is claimed is:

1. An autonomy computing system comprising:

at least one memory configured to store machine executable instructions; and at least one processor coupled to the at least one memory and configured to execute the machine executable instructions to configure the at least one processor to:

receive a first temperature measurement at a first time $t_1$ and a second temperature measurement at a second time $t_2$, wherein the first temperature measurement and the second temperature measurement are measured proximate a lens surface for a camera sensor using a first temperature sensor, wherein the second time $t_2$ is later than the first time $t_1$;

receive a third temperature measurement at the first time $t_1$ and a fourth temperature measurement at the second time $t_2$, wherein the third temperature measurement and the fourth temperature measurement are measured using a second temperature sensor for ambient air of a vehicle on which the camera sensor, the first temperature sensor, and the second temperature sensor are mounted;

compute a first change of temperature between the second temperature measurement and the first temperature measurement;

compute a second change of temperature between the fourth temperature measurement and the third temperature measurement; and in response to determining that the first change of temperature is greater than the second change of temperature by a predetermined threshold value, activate a heating element in proximity of the camera sensor to increase temperature and thereby reducing presence of a liquid particle at the lens surface.

2. The autonomy computing system of claim 1, wherein in response to determining that the first change of temperature is greater than the second change of temperature by the predetermined threshold value, the camera sensor is changed to the inactive or offline status for a predetermined time duration.

3. The autonomy computing system of claim 1, wherein, upon determining the presence of the liquid particle, the at least one processor is further configured to execute the machine executable instructions to configure the at least one processor to discard new image data generated by the camera sensor.

4. The autonomy computing system of claim 3, wherein the new image data is discarded for a predetermined time duration.

5. The autonomy computing system of claim 1, wherein the first temperature sensor is positioned internally at the lens surface of the camera sensor.

6. The autonomy computing system of claim 1, wherein the first temperature sensor is positioned externally at the lens surface of the camera sensor.

7. The autonomy computing system of claim 1, wherein in response to determining that the first change of temperature is not greater than the second change of temperature by the predetermined threshold value after activating the heating element, deactivate the heating element in proximity of the camera sensor.

8. A computer-implemented method for detecting presence of a liquid particle at a camera lens surface, the computer-implemented method comprising:

- receiving a first temperature measurement at a first time $t_1$ and a second temperature measurement at a second time $t_2$, wherein the first temperature measurement and the second temperature measurement are measured proximate the camera lens surface for a camera sensor using a first temperature sensor, wherein the second time $t_2$ is later than the first time $t_1$;
- receiving a third temperature measurement at the first time $t_1$ and a fourth temperature measurement at the second time $t_2$, wherein the third temperature measurement and the fourth temperature measurement are measured using a second temperature sensor for ambient air of a vehicle on which the camera sensor, the first temperature sensor, and the second temperature sensor are mounted;
- computing a first change of temperature between the second temperature measurement and the first temperature measurement;
- computing a second change of temperature between the fourth temperature measurement and the third temperature measurement; and
- in response to determining that the first change of temperature is greater than the second change of temperature by a predetermined threshold value, activating a heating element in proximity of the camera sensor to increase temperature and thereby reducing presence of a liquid particle at the lens surface.

9. The computer-implemented method of claim 8, further comprising in response to determining that the first change of temperature is greater than the second change of temperature by the predetermined threshold value, changing the camera sensor to the inactive or offline status for a predetermined time duration.

10. The computer-implemented method of claim 8, further comprising discarding new image data generated by the camera sensor upon determining the presence of the liquid particle at the camera lens surface.

11. The computer-implemented method of claim 10, wherein the new image data is discarded for a predetermined time duration.

12. The computer-implemented method of claim 8, wherein the first temperature sensor is positioned internally at the camera lens surface of the camera sensor.

13. The computer-implemented method of claim 8, wherein the first temperature sensor is positioned externally at the camera lens surface of the camera sensor.

14. The computer-implemented method of claim 8, further comprising in response to determining that the first change of temperature is not greater than the second change of temperature by the predetermined threshold value after activating the heating element, deactivating the heating element in proximity of the camera sensor.

15. An autonomous vehicle comprising:

- a plurality of camera sensors;
- at least one memory configured to store machine executable instructions; and
- at least one processor communicatively coupled with the at least one memory and configured to execute the machine-executable instructions for detecting presence of a liquid particle at a camera lens surface of a camera sensor of the plurality of camera sensors by performing operations comprising:
  - receiving a first temperature measurement at a first time $t_1$ and a second temperature measurement at a second time $t_2$, wherein the first temperature measurement and the second temperature measurement are measured proximate the camera lens surface of the camera sensor using a first temperature sensor, wherein the second time $t_2$ is later than the first time $t_1$;
  - receiving a third temperature measurement at the first time $t_1$ and a fourth temperature measurement at the second time $t_2$, wherein the third temperature measurement and the fourth temperature measurement are measured using a second temperature sensor for ambient air of a vehicle on which the camera sensor, the first temperature sensor, and the second temperature sensor are mounted;
  - computing a first change of temperature between the second temperature measurement and the first temperature measurement;
  - computing a second change of temperature between the fourth temperature measurement and the third temperature measurement; and
  - in response to determining that the first change of temperature is greater than the second change of temperature by a predetermined threshold value, activating a heating element in proximity of the camera sensor to increase temperature and thereby reducing presence of a liquid particle at the lens surface.

16. The autonomous vehicle of claim 15, wherein the operations further comprising in response to determining that the first change of temperature is greater than the second change of temperature by the predetermined threshold value, changing the camera sensor to the inactive or offline status for a predetermined time duration.

17. The autonomous vehicle of claim 15, wherein the operations further discarding new image data generated by the camera sensor for a predetermined time duration upon determining the presence of the liquid particle at the camera lens surface.

18. The autonomous vehicle of claim 15, wherein the first temperature sensor is positioned internally at the camera lens surface of the camera sensor.

19. The autonomous vehicle of claim 15, wherein the first temperature sensor is positioned externally at the camera lens surface of the camera sensor.

20. The autonomous vehicle of claim 15, wherein the operations further comprising in response to determining that the first change of temperature is not greater than the second change of temperature by the predetermined threshold value after activating the heating element, deactivating the heating element in proximity of the camera sensor.

* * * * *